(Specimens.)
E. DODÉ.
PROCESS OF SEPARATING GOLD AND PLATINUM FROM OTHER METALS IN SOLUTION.
No. 440,143. Patented Nov. 11, 1890.
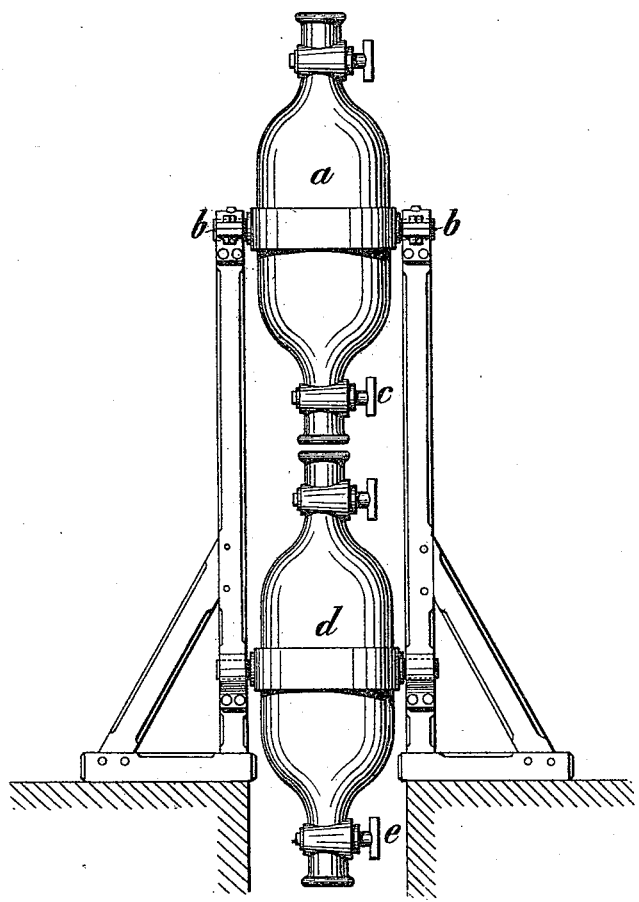
Witnesses
Inventor
Edouard Dodé
BY
Attorneys United States Patent Office.

EDOUARD DODÉ, OF PARIS, FRANCE.

PROCESS OF SEPARATING GOLD AND PLATINUM FROM OTHER METALS IN SOLUTION.

SPECIFICATION forming part of Letters Patent No. 440,143, dated November 11, 1890.

Application filed October 4, 1889. Serial No. 325,963. (Specimens.)

*To all whom it may concern:*

Be it known that I, EDOUARD DODÉ, of the city of Paris, France, have invented a Process of Separating Gold and Platinum from other Metals in Solution, of which the following is a full, clear, and exact description.

My invention relates to a new process for the immediate separation of the gold and platinum from silver and other metals contained in solutions from which the three precious metals are to be extracted.

In the drawing, the preferred apparatus for carrying my invention into effect is shown in side elevation.

My process is as follows: I first take a solution of gold, platinum, silver, copper, and tin, obtained by dissolving ingots in acid and water, and place the same in the vessel $a$ and pour in three hundred grams of sulphuric ether or other equivalent substance—such as, for example, chloroform or glycerine—for every one hundred grams of metal treated. The apparatus is oscillated upon its gudgeons $b$ in order to thoroughly mix the ether with the solution. The motion of the apparatus is arrested for a few moments and the ether rises to the surface, carrying with it a great part of the gold. The progress of the operation is indicated by the yellow color acquired by the ether. The vessel is then agitated a second and third time, after which the operation of separating the gold is complete. The contents of the lower part of vessel $a$ are run off at cock $c$ into another and similar vessel $d$, placed immediately below it, care being taken to retain in vessel $a$ the ether containing the gold, which is treated as hereinafter described. There thus remains in the solution the platinum, copper, tin, and a small portion of the silver, the latter having been almost wholly precipitated as the solution in the aqua regia progressed. In order to insure that no silver remains in the solution, one kilogram of sea-salt is dissolved in three liters of water and a small portion is added to the solution, and if the latter becomes turbid more is added drop by drop, stirring meanwhile. The precipitate is allowed to settle and the silver which is obtained by decantation or filtration is washed in water containing a small portion of liquid ammonia for removing all traces of acid. The solution in the vessel $d$ now contains platinum, copper, and tin, and said vessel is raised to the position occupied by vessel $a$ and turned on its gudgeons. The platinum is first treated, the other metals being of minor importance. For this purpose essence of lavender is added to the solution (or its equivalent—namely, other essence, such as that of turpentine, thyme, &c., or other essential oils—may be used) in the proportion of three times the weight of that of the metal treated, the operation being performed in the same manner as for gold, and, although slower, with the same certainty. The solution should be continually agitated until the essential oil becomes of a fine deep-brown color, when it is allowed to rise to the surface of the liquid charged with the platinum and the solution is run off at cock $e$. There then remains in the acids the copper and tin, which can be readily separated after previously ascertaining that no platinum is left in the solution by placing a small portion in a test-glass, adding three times its volume of water, and then a few drops of ammonia, whereupon a precipitate is immediately formed. If it be of a yellow tint, this is an indication that the solution still contains platinum, and if white that tin only is contained. In the former event the operation is recommenced by treating with essential oil of lavender until the whole of the platinum is extracted in solution. To the solution containing only copper and tin sufficient ammonia is then added to precipitate the tin. The copper remaining in solution is recovered by evaporating. After the metals have been thus perfectly separated the separation of the gold and platinum from their respective solutions is next proceeded with.

The auriferous solution is poured into a porcelain capsule, which is placed in a still of glass or enameled iron, porcelain, &c., heated by a water-bath and in communication by means of a condensing-worm with a receiver for the ether, which is driven off from the gold by a very moderate heat, leaving only pure gold in the capsule. The operation is similar for the platinum; but greater heat is necessary in order to volatilize the essence of lavender which is recovered, and can, like the ether, be used over again, the loss being insignificant.

I claim—

The herein-described process of separating from an acid solution of gold, platinum, copper, and tin the metallic constituents of said solution, which process consists in first subjecting the entire solution in the presence of ether to agitation until the ether becomes yellow, in then decanting the remaining solution from the yellow ether, in then subjecting said remaining solution to agitation in the presence of essence of lavender until the essential oil becomes brown, and in then decanting from the brown essential oil the remaining solution and adding thereto ammonia, all substantially as hereinbefore described for the purpose specified.

The foregoing specification of my improvements in refining and separating precious metals signed by me this 13th day of September, 1889.

EDOUARD DODÉ.

Witnesses:
R. J. PRESTON,
ALBERT MOREAU.